Figure 3:
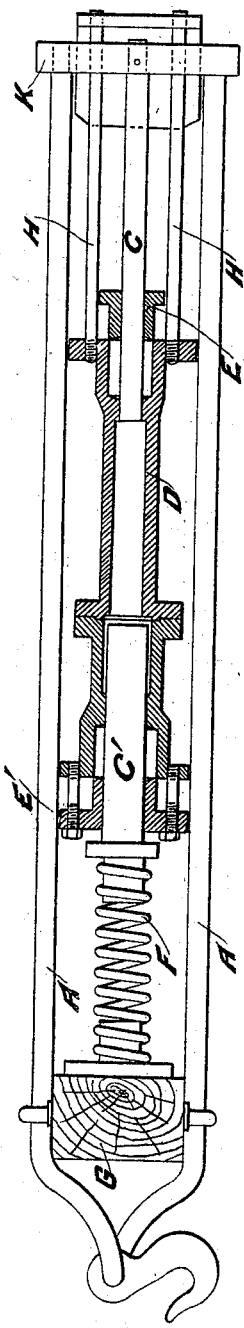

No. 625,773. Patented May 30, 1899.
T. JONES.
DRAFT ATTACHMENT FOR VEHICLES.
(Application filed Mar. 14, 1899.)
(No Model.) 2 Sheets—Sheet 1.
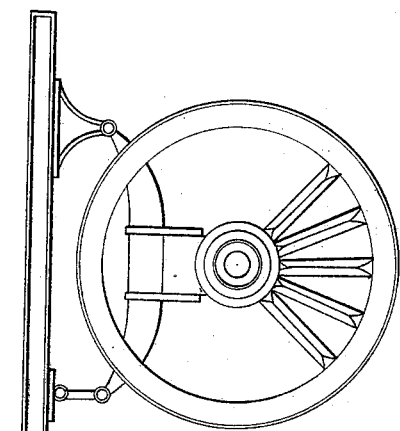
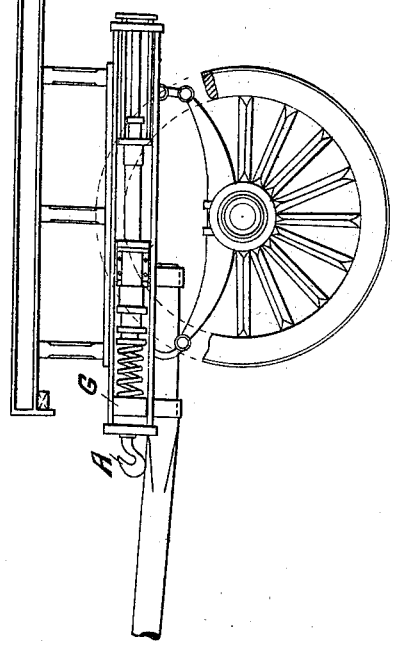
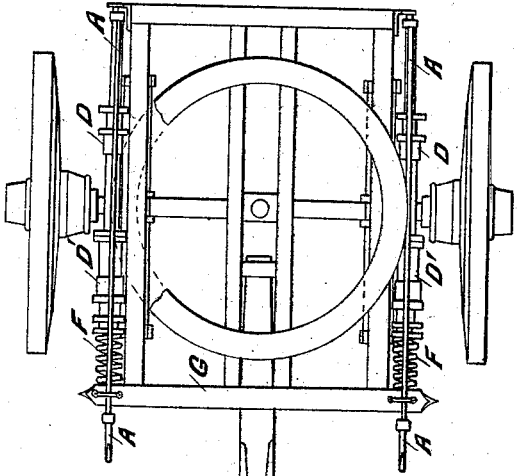
WITNESSES:
INVENTOR
Thomas Jones
BY
Richard
ATTORNEYS No. 625,773. Patented May 30, 1899.
T. JONES.
DRAFT ATTACHMENT FOR VEHICLES.
(Application filed Mar. 14, 1899.)

(No Model.) 2 Sheets—Sheet 2.

WITNESSES:
INVENTOR
Thomas Jones
BY
ATTORNEYS

THE NORRIS PETERS CO., PHOTO-LITHO., WASHINGTON, D. C.

UNITED STATES PATENT OFFICE.

THOMAS JONES, OF LONDON, ENGLAND.

DRAFT ATTACHMENT FOR VEHICLES.

SPECIFICATION forming part of Letters Patent No. 625,773, dated May 30, 1899.

Application filed March 14, 1899. Serial No. 709,046. (No model.)

*To all whom it may concern:*

Be it known that I, THOMAS JONES, gentleman, a subject of the Queen of Great Britain and Ireland, residing at 223 Camden road, London, N. W., England, have invented certain new and useful Improvements in or Relating to the Traction or Propulsion of Road-Vehicles, (for which I have filed an application in Great Britain, No. 12,964, dated June 9, 1898,) of which the following is a specification.

This invention relates to improvements in apparatus for attachment to draft-vehicles for the purpose of reducing the strain on the horse or animal employed for drawing and starting the vehicle.

In the accompanying sheets of explanatory drawings, Figure 1 is a side elevation, and Fig. 2 is a part, of a wagon having my draft-strain-checking apparatus attached thereto. Fig. 3 is a sectional elevation in detail of one method of constructing my improved apparatus.

In carrying my invention into effect as applied to draft-vehicles I attach the animal to the vehicle in any of the usual ways for keeping it in position and for enabling the vehicle to be turned, while the draft from the animal and pulling effort I take up by means of traces or the like, which I carry from the animal to a draw-bar A or draw-bars arranged upon the vehicle B in convenient positions and having in connection therewith movable pistons or plungers C C', working in hydraulic or air-compressing cylinders D D', carried upon the body or frame of the vehicle.

I arrange my cylinders D D' with the plungers C C' within them and preferably in the form of differential cylinders, in which varying areas of liquid are acted upon by varying sizes of plungers or pistons C C', the pistons moving in or out according as the strain or pulling effort may be increased or reduced, and by this arrangement I am enabled to provide a minimum amount of travel upon the plunger C' and at the same time to take up the full extent of the travel pull or effort which the animal may from time to time exert with greater or less effect upon the draw-bar A. I prefer to carry the end of my pistons or plungers through a stuffing box or boxes E E' on each cylinder and to encircle the projecting end of the piston C with a spring or springs F to take up the shock which may be induced upon the starting of the vehicle and also for the purpose of returning the plungers C C' to their positions when there is a cessation or slackening of the pulling effort of the animal within the shafts. The spring or springs F, I place preferably between the piston C' and the framework G of the vehicle, so that the draw-bar A causes their compression, as described.

I arrange guide-bars or guide-rods H upon the piston cross-heads K for keeping the pistons in position.

I arrange my cylinders and their connections in such a manner that when the pulling effort of the animal is increased, or when a greater amount of energy is required to move the vehicle along, the pressure of the springs upon the cross-head and against the head of the larger ram or piston is overcome by the transmission of the pulling force from the smaller ram to the liquid within the cylinders, which thus takes up the sudden shock, and the spring or springs between the ram-head and the cross-head become compressed. Similarly when the effort is released or the pull decreased by the animal then the excess energy which has been accumulated during the previous movements and which has compressed the springs operates to force back the plungers to the normal working position. The difference in the area of the draw-bar plunger to that of the spring-compressing plunger enables a long stroke or pull to be made with a distance or travel of the spring when compressed.

I do not limit the application of my invention to any particular form or to any special number of cylinders or plungers, but I modify the number of and arrangement of the cylinders and their connections to suit the type of vehicle to which my apparatus is to be attached, and, further, it is evident that agricultural implements may have the improved devices applied without departing from the subject of the present invention.

Having thus described my invention, what I claim as new, and desire to secure by Letters Patent, is—

1. In combination, the cylinders supported on the frame, the piston working in one of them, a spring connected with the frame and with the piston, a second piston working in the other cylinder in opposition to the spring-pressed piston and the draw-bar connected to the second piston, substantially as described.

2. In combination, the frame, the cylinders D, D' placed end to end communicating with each other and of different area, the pistons working in opposition to each other in said cylinders, the draw-bar connected with one of the pistons and the spring connected with the other piston and supported on the frame, substantially as described.

In witness whereof I have hereunto set my hand in presence of two witnesses.

THOMAS JONES.

Witnesses:
WILLIAM EDWARD EVANS,
ALBERT E. PARKER.